No. 627,199. Patented June 20, 1899.
J. & G. W. McDONNELL.
BICYCLE.
(Application filed Apr. 9, 1898.)
(No Model.)
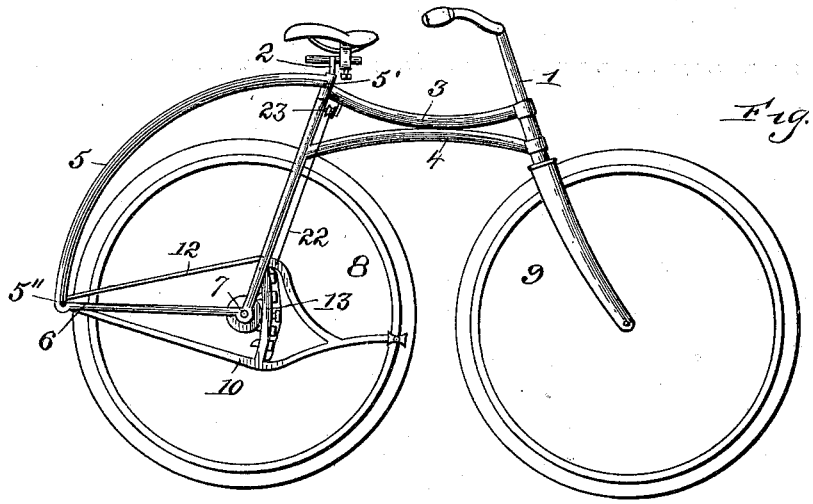
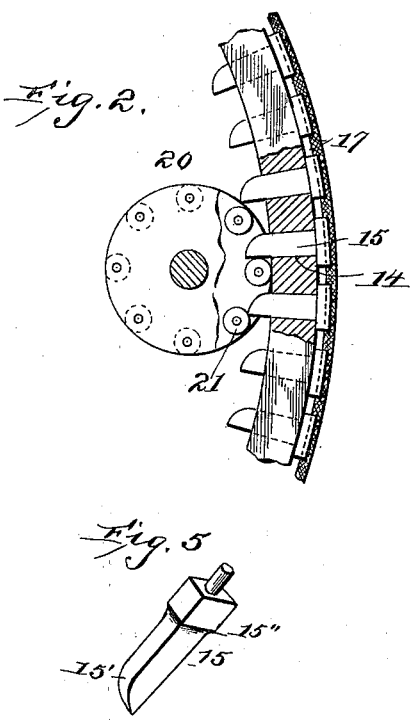
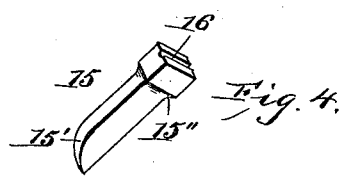
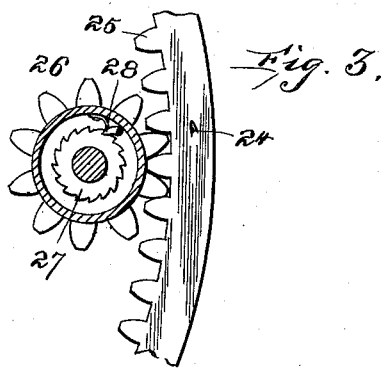
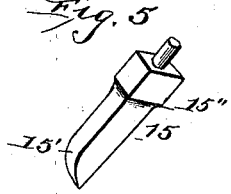
Witnesses
Thos. H. Edwards Jr.
J. W. Mothershead
Inventors
John McDonnell 2d
Goodwin W. McDonnell
By Edson Bros.
Attorneys

UNITED STATES PATENT OFFICE.

JOHN McDONNELL AND GOODWIN W. McDONNELL, OF ELMA, IOWA.

BICYCLE.

SPECIFICATION forming part of Letters Patent No. 627,199, dated June 20, 1899.

Application filed April 9, 1898. Serial No. 677,088. (No model.)

*To all whom it may concern:*

Be it known that we, JOHN MCDONNELL and GOODWIN W. MCDONNELL, citizens of the United States, residing at Elma, in the county of Howard and State of Iowa, have invented certain new and useful Improvements in Bicycles; and we do hereby declare the following to be a full, clear, and exact description of the invention, such as will enable others skilled in the art to which it appertains to make and use the same.

Our invention relates to improvements in velocipedes or bicycles, and has for its object to provide mechanism which enables the operator to ride with greater ease and comfort and overcoming the disadvantages and objections to the usual crank-and-chain propulsion.

Another object we have in view is to so construct the framework as to make the bicycle more compact and also to save material. The operator when riding on the machine throws more weight on the wheels than on the framework, as is now the case. We dispense with the use of cranks between the wheels, and are thereby enabled to bring the latter nearer together.

A still further object is to provide suitable driving mechanism whereby the operator can propel the vehicle with greater ease, as his feet have one-third less distance to travel than in the usual crank-and-gear propulsion, and the invention also permits of a long or short stroke or allows the operator to rest his feet on the pedals while the machine is in motion, as in "coasting." This propelling mechanism is operatively geared directly to the drive-wheel and there is no lost motion, thus doing away with the necessity of sprocket-wheels and chain or the gears and shaft which are used in lieu of the chain. With our device the power is applied direct to the drive-wheel.

The invention consists of a bicycle or velocipede having the usual steering-post and handle-bars and the usual rear or saddle post, connecting which are two or more curved braces, an arm extending rearwardly from the saddle-post to a suitable point in the rear of the drive-wheel, which arm is supported from the hub of the drive-wheel by means of a brace-rod.

The propelling mechanism consists of operating-levers pivoted to the rearwardly-extending arm of the framework, the forward end of which is provided with suitable pedals, braces for said levers, and rack-and-gear mechanism connecting the operating-levers directly with the drive-wheel; and the invention further consists in the detailed construction of parts, which will be hereinafter more particularly pointed out and claimed.

Reference is made to the accompanying drawings, forming a part of this specification, in which—

Figure 1 is a side elevation of a bicycle. Fig. 2 is an enlarged detail view of the preferred form of driving mechanism, parts being in section. Fig. 3 is an enlarged detail view of a modification of driving means, parts being in section. Fig. 4 is a perspective view of one of the ratchet-teeth. Fig. 5 is a detail view of a modification of the ratchet-teeth.

Like reference-numerals denote like and corresponding parts in all the figures of the drawings, referring to which—

1 denotes the steering-post, and 2 the rear or saddle post. The steering-post and the saddle-post are connected by two (preferably) curved braces 3 4. The upper brace 3 extends on a curved line from a point at or near the top of the steering-post 1 downwardly, thence upwardly, and is connected to the rear or saddle post 2. The lower brace 4 is also curved and extends upwardly from a suitable point on the steering-post 1 below the junction of the brace 3 with said post, meeting or joining the brace 3, and thence extends downwardly and is united to the rear or saddle post, preferably on or about the same horizontal plane as its unison with the steering-post.

A rearwardly-extending arm 5 has one end united to the rear or saddle post 2, at a point near the top thereof, at 5' and its other end united to a brace-rod 6 at 5''. This brace-rod 6 extends from the point 5'' to the hub 7 of the rear or drive wheel 8. The wheels 8 9 are journaled in suitable bearings in the frame, as will be understood. The posts 1 and 2 are preferably inclined at a slight angle toward each other, diverging downward to the point where they connect with the axles of the wheels, as shown, and are braced and held in that position by the curved braces 3 and 4. The seat and handle-bar are secured to the saddle-post and steering-post, respectively, in any preferred manner.

Pivoted to the rearwardly-extending arm 5 at 5" are the operating-levers 10 10, one on each side of the drive-wheel 8. These levers extend in a downwardly direction from the pivotal point 5" to a point below and slightly forward the hub 7 of the rear or driving wheel 8, and thence extend upward and forward a suitable distance in front of said hub 7. The front end of each lever is provided with a pedal 11 of any preferred construction. The operating-levers 10 10 are provided with suitable lever-braces 12 12, which are connected to the levers 10 at 5" and extend on an upwardly-inclined plane above the hub 7, and then downwardly at a sharp angle in front of said hub and are connected to the operating-lever, near the front end thereof. These lever-braces 12 may be formed of steel or other suitable material and cast with the levers 10, or they may be made separate and welded or otherwise secured to the operating-levers.

Between the operating-lever 10 and the lever-brace 12 we provide a suitable rack 13, which is preferably slightly curved, as shown, and is fastened between said lever and lever-brace so that it will have reciprocating motion in front of the hub 7, with which it has operative engagement. This rack has a series of apertures 14 extending transversely through the same, in which apertures we provide suitable movable ratchet-teeth 15, which are substantially wedge-shaped in form, being widest at their outer end. The edge of each tooth 15 is shorter on one side than the other, thus making the face of the inner end oblique, as at 15', to the longitudinal axis of the tooth. In Fig. 4 we have illustrated the tooth having a shoulder 15" near its head, which shoulder is adapted to rest on the outer surface of the rack 13, and is also provided with a groove across its outer surface or head, as at 16, in which is designed to rest a suitable elastic band 17 to exert constant pressure on the tooth and to force said tooth in the apertures 14, and yet allow a limited amount of reciprocating play. This elastic band 17 may be composed of rubber or a single coiled spring or any other suitable material. This band 17 is fastened at both ends of the rack 13 and extends almost the full length thereof, said band being adapted to lie in the groove 16 in the heads of the ratchet-teeth 15, thus controlling the movements of each tooth.

If desired, we may provide a small coiled spring, one for each ratchet-tooth, the outer or free end of said spring adapted to bear against a suitable strip of leather or spring-steel, as indicated in Fig. 5, which would extend over the entire series and be fastened to the rack 13 similar to the elastic band 17. This would allow each tooth to be individually controlled by a spring and yet the whole series protected and held in position by a band 18.

Fastened to and integral with the drive-wheel 8, at the hub 7 thereof, we provide a cog-wheel 20, in which in lieu of the teeth we provide rollers 21, journaled between the two walls or disks thereof or in a groove therein. These rollers are adapted to engage with the ratchet-teeth 15 to move the cog and drive wheels on the downstroke of the rack and on the upward movement of said rack offer but little resistance to the teeth, and yet said rollers effectually push the teeth out of the path of said cog-wheel.

It will be understood that the driving mechanism just described is duplicated on the opposite side.

We prefer to connect the operating-levers 10 10 by means of a band or strap 22, attached, preferably, to one of the lever-braces 12 and carried upward and passed over a suitable pulley 23, located at a suitable point on the framework, and thence down to the other lever-brace, where it is fastened. This band or strap 22 is to control the return of the operating-lever after it has made its stroke. It will be readily seen that after one lever has made the downstroke it will be drawn up to its raised position again ready for service as the other lever is making the stroke.

If desired, we may dispense with the band or strap 22 and extend a rack upwardly from the lever-braces, said racks having their teeth facing each other, and in lieu of the pulley 23 we may provide a gear-wheel and locate the same between said brace-racks. It will be seen that this construction will have the same effect upon the levers.

In Fig. 3 we have illustrated a modification of our driving mechanism. In this construction we use the same operating-levers and lever-braces; but in lieu of movable teeth on the racks 24 we use solid teeth 25, which are formed integral with the rack. This rack is adapted to engage with a cog-wheel 26, which from outside appearances is in the form of an ordinary gear; but said cog-wheel is loosely mounted on the spindle of the drive-wheel 8. On the hub of said drive-wheel is a small cog-wheel 27, which fits into a recess provided for the same in the inner face of the cog 26, and in said recess is pivoted a spring-pressed dog 28. When the operating-lever 10 is pressed down, the teeth of the rack 24 engage the teeth 25 of the cog-wheel 26 and cause the same to revolve. This in turn causes the dog 28 to engage the teeth of the small inner cog-wheel 27 and cause it to revolve, and as said cog-wheel 27 is integral with the drive-wheel 8 said drive-wheel is set in motion. This construction will also enable the rider to rest or "coast" or to take a short or long stroke, as in the construction hereinbefore described.

It is thought that the operation of the invention will be apparent from the foregoing description, taken in connection with the drawings. The rider applies force to a pedal, which forces down one of the levers 10, causing the ratchet-teeth 15 to engage the rollers 21 of the cog-wheel 20, and as said cog-wheel is rigidly fastened to the drive-wheel the latter is caused to revolve. As the two levers 10 10 are connected one to the other, as at 22, it will be seen that when one lever is down the other is up ready for the next stroke. It will be readily understood how an operator can take a long or short stroke, and after he secures sufficient momentum he can rest his feet on the pedals and allow the bicycle to continue its course.

As before stated, by our construction we apply the power direct to the drive-wheel and dispense with the use of a sprocket-wheel, thus enabling us to bring the wheels 8 and 9 closer together. The pedals do not extend beyond the diameter of the drive-wheel, and therefore do not interfere with the front or steering wheel. We aim to place the operating-levers in such relation to the saddle as to permit of great power being applied to the drive-wheel. Great leverage is obtained without being in the way or making the machine inconvenient or cumbersome.

Our construction makes the device more compact and durable, and yet is quite simple.

We are aware that slight changes and alterations in the form and proportion of parts and in the details of construction of the devices herein shown and described as the preferred embodiment of our invention may be made by a skilled mechanic without departing from the spirit or sacrificing the advantages of the same; but we reserve the right to make such modifications and changes as fairly fall within the scope of our invention.

Having thus fully described our invention, what we claim as new, and desire to secure by Letters Patent, is—

1. In a bicycle-frame, the combination with the steering and saddle posts, of curved braces meeting in the center and forked or separated at a point between the center and their ends, said braces connecting the steering-post and saddle-post at a point above the wheels, a rearwardly-extending arm connected to the saddle-post and the rearwardly-extending brace-rod, and propelling mechanism pivotally attached between the said arm and brace-rod, and having operative engagement with the drive-wheel, substantially as described.

2. In a propelling mechanism for bicycles, an operating-lever, having a lever-brace connected thereto, pivotally mounted upon a frame at the rear thereof, a rack mounted between said lever and lever-brace, said rack having apertures to receive movable teeth, which are held in place on the rack by a resilient band passing over the protruding heads of the teeth, and a cog-wheel formed integral with the drive-wheel and constructed for operative engagement with the rack, substantially as described.

3. In a propelling mechanism for bicycles, an operating-lever pivotally mounted upon the frame at the rear thereof, a lever-brace connected to said lever at or near the ends thereof, a movable toothed rack mounted between said lever and lever-brace, apertures in said rack and beveled or tapered teeth playing in said apertures, the teeth provided with shoulders or abutments to rest against the outer surface of the rack and the heads of said teeth being longitudinally grooved to receive a resilient band to normally force the teeth into engagement with the cog-wheel, and a cog-wheel mounted rigidly upon a driving-wheel, substantially as described.

4. In a bicycle, the combination with a frame comprising saddle and seat posts united at their upper portions by connecting-braces arranged in a plane above the bicycle-wheels, a rearwardly-extending arm, and brace-rods, of operating-levers pivoted between said rearwardly-extending arm and brace-rods, which levers are located below and extend forward of the cog-wheels, lever-braces attached to the operating-levers at each end thereof and extending over the cog-wheels, curved racks mounted between said levers and lever-braces in front of the cog-wheel, said cog-wheels rigid with the drive-wheel, and a band or strap passing over a pulley said strap connecting the operating-levers, as and for the purposes described.

In testimony whereof we affix our signatures in presence of two witnesses.

JOHN McDONNELL.
GOODWIN W. McDONNELL.

Witnesses:
JOHN H. MAYO,
MARK DALTON.